United States Patent [19]

Tato et al.

[11] 3,882,084
[45] May 6, 1975

[54] OPTICALLY CROSS-LINKABLE POLYMER

[75] Inventors: Masao Tato, Yokohama; Masaki Hasegawa, Tokyo; Taro Ichijyo, Kamakura, all of Japan

[73] Assignee: Agency of Industrial Science & Technology, Tokyo, Japan

[22] Filed: June 8, 1972

[21] Appl. No.: 272,930

Related U.S. Application Data

[63] Continuation-in-part of Ser. No. 46,836, June 16, 1970, abandoned.

[52] U.S. Cl............. 260/47 UA; 96/115 P; 117/161; 260/80 P; 260/80.3 E; 260/85.5 A; 260/96.1 N; 260/86.3 R; 260/86.7 R; 260/88.7 A; 260/89.3 R
[51] Int. Cl........................... C08f 3/42; C08f 15/02
[58] Field of Search........ 260/47 UA, 63 R, 63 UY, 260/89.3, 86.1 E, 476 R; 96/115 P

[56] References Cited
UNITED STATES PATENTS 2,934,526  4/1960  Hoffmann.......................... 260/88.1
3,364,282  1/1968  D'Alelio............................. 260/88.1

*Primary Examiner*—Christopher A. Henderson
*Attorney, Agent, or Firm*—Ernest G. Montague; Karl F. Ross; Herbert Dubno

[57] ABSTRACT

A composition is produced by combining one or more members selected from the group consisting of cinnamic acid-vinylphenyl ester, cinnamic acid-isoalkenylphenyl ester, and homologs thereof, styrylacrylic acid-vinylphenyl ester, styrylacrylic acidisoalkenylphenyl ester and homologs thereof with a cationic polymerization catalyst. This composition is polymerized or copolymerized to form a novel photosensitive product. The product thus obtained is a linear polymer or copolymer in which only the vinyl group or isoalkenyl group is polymerized and the photosensitive group is quantitatively retained in the side chain. The polymer of copolymer has a high degree of photosensitivity and permits photosensitizing reaction to occur uniformly.

4 Claims, No Drawings

OPTICALLY CROSS-LINKABLE POLYMER

REFERENCE TO RELATED APPLICATION

This is a continuation-in-part of our copending application Ser. No. 46,836 filed June 16, 1970, now abandoned.

This invention relates to a novel photosensitive polymer. More particularly, the present invention relates to a photosensitive polymer in which only the vinyl group or isoalkenyl group is polymerized and the side chain contains a group of the generic formula:

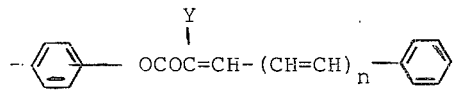 (1)

(wherein, the phenyl group in the styrylacrylic acid group or cinnamic acid group is one member selected from the class consisting of unsubstituted groups, substituents of chlorine, fluorine, nitro group, cyano group, methoxy group, and methyl group which are inactive to phenolic hydroxy groups and carboxylic acid-chlorides, $n$ is 0 or 1, and Y is one member selected from the class consisting of H and CN group).

The photosensitive resins of photodimerization type which have been known to date include photosensitive resin compositions which contain, as photosensitive components, compounds of the type obtained by esterifying cinnamic acid with poly(vinyl alcohol) and compounds of the type obtained by incorporating a benzalacetophenone group or the like into the aromatic ring of polystyrene. In these photosensitive resin compositions which are obtained by such polymer reactions, the introduction of photosensitive group and the like into the backbone polymer chain cannot generally be accomplished with uniformity. Thus, they provide ununiform photo reaction, tend to induce such undesirable phenomena as fogging and defy all efforts to improve the photosensitivity over a certain level.

The photosensitive polymer of the present invention is very simple to manufacture and has a structure in which the characteristic group capable of conferring photosensitivity is introduced completely into the backbone polymer chain.

The photosensitive polymer according to the present invention contains as its photosensitive component the linear cationic polymer or linear cationic copolymer of a compound represented by the generic formula:

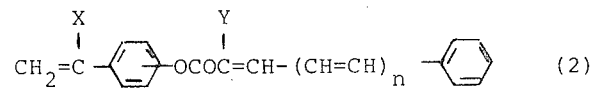 (2)

(wherein, X is H or a lower alkyl group, $n$ is 0 or 1, and Y and the phenyl group in the styrylacrylic acid group or cinnamic acid group are the same as those in (1) above).

The said polymer is obtained by homopolymerizing or copolymerizing the aforesaid compound in the presence of a cationic catalyst. Thus, the polymerization or copolymerization product of this invention is of a type which has had only the vinyl or isoalkenyl group moiety thereof undergo addition polymerization and contains an unsaturated group represented by the generic formula (1) in the side chain thereof.

In other words, the polymer of the present invention has a structure in which only the vinyl group or isoalkenyl group thereof is polymerized and the photosensitive group is contained in the side chain. This photosensitive group is invariably contained from the beginning in the starting monomer, so that it is introduced quite regularly and completely into the linear polymer to be formed of that monomer. Consequently, the polymer of this invention enjoys a higher degree of sensitivity than the conventional photosensitive polymers and permits the photosensitizing reaction to proceed uniformly. Further, it exhibits outstanding behaviors as a photoresist and provides excellent photographic resolution.

Accordingly, it is used for the production of precision printing plates, integrated circuits, large scale integrated circuits, etc.

As already mentioned, linear copolymers formed with chain polymerizable compounds other than those compounds represented by the aforesaid generic formula (2) are also embraced by the present invention. Use of these linear copolymers enables the produced polymers to acquire desired degrees of photosensitivity for different purposes.

It is the main object of this invention to provide a novel, industrially useful linear polymer possessed of very high photosensitivity.

Other objects and characteristic features of the present invention will become apparent to those skilled in the art from the following, more detailed description of the invention.

The compound of the generic formula (2), namely the raw material for the polymer of this invention, is a novel compound which has never been disclosed in literature. This compound contains within one same molecular unit two unsaturated groups opposed in reactivity to each other, i.e., a chain polymerizable double bond and an olefinic double bond. In addition to being useful as the raw material for the photosensitive polymer, this compound is highly useful as an intermediate for the production of organic substances. It is also very useful as a cross-linking agent.

First, an explanation is given of the compound of formula (2) where n = 0, namely, the compound of cinnamic acid-phenyl ester type. One member selected from the group consisting of ortho-, meta- and para-vinylphenols and ortho-, meta- and paraisopropenylphenols is reacted with cinnamic acid-chloride or a homologous chloride thereof.

This reaction takes place between the phenolic hydroxy group and the carboxylic acid-chloride. In the presence of pyridine, triethylamine or the like serving as a basic hydrogen chloride-removing agent, this reaction proceeds as shown in the following equation.

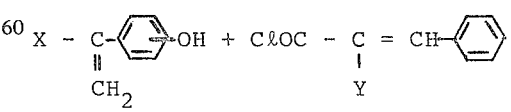

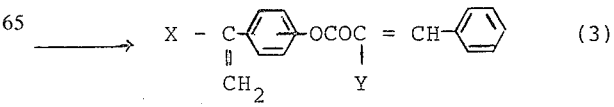 (3)

[wherein, X, Y and the phenyl group in the cinnamic acid group are the same as those in Formula (2) above].

Generally, this reaction proceeds readily at normal room temperature without a solvent. Dioxane or acetone may be used as a solvent therefor as occasion demands. Optionally, the reaction may be controlled by cooling or heating the reaction system. In the compound formed by this reaction, if the phenyl group in the cinnamic acid group admits a substituent, this substituent may be attached to the phenol group at any of the ortho-, meta- and para-positions. The phenol usable as the raw material for the present purpose may likewise have any of the ortho-, meta- and para-configurations. This reaction produces compounds, which vary with the kind of raw material to be used.

Examples of the product of this reaction are cinnamic acid-vinylphenyl ester, cinnamic acid-isopropenylphenyl ester, nitro-cinnamic acid-vinylphenyl ester, nitro-cinnamic acid-isopropenylvinyl ester, chloro-cinnamic acid-vinylphenyl ester, chloro-cinnamic acid-isopropenylphenyl ester, methoxy-cinnamic acid-vinylphenyl ester, methoxy-cinnamic acid-isopropenylphenyl ester, methyl-cinnamic acid-vinylphenyl ester, methyl-cinnamic isopropenylphenyl ester, cyano-cinnamic acid-vinylphenyl ester, cyano-cinnamic acid-isopropenylphenyl ester, α-cyano-cinnamic acid-vinylphenyl ester, nitro-α-cyano-cinnamic acid-vinylphenyl ester, nitro-α-cyano-cinnamic acid-isopropenylphenyl ester, chloro-α-cyano-cinnamic acid-vinylphenyl ester, chloro-α-cyano-cinnamic acid-isopropenylphenyl ester, methoxy-α-cyano-cinnamic acid-vinylphenyl ester, methoxy-α-cyano-cinnamic acid-isopropenylphenyl ester, methyl-α-cyano-cinnamic acid-vinylphenyl ester, methyl-α-cyano-cinnamic acid-isopropenylphenyl ester, cyano-α-cyano-cinnamic acid-vinylphenyl ester and cyano-α-cyano-cinnamic acid-isopropenylphenyl ester.

An explanation is now given of the method for producing the novel photosensitive polymer of this invention by using the aforesaid novel compound as the raw material.

The polymer of this invention is produced by polymerizing one kind or two or more kinds of the aforesaid novel compound or copolymerizing such novel compound with a chain polymerizable unsaturated monomer of the type described hereinafter.

Examples of the chain polymerizable unsaturated monomer are such cationically polymerizable compounds as alkylvinyl ethers, alkylisoalkenylvinyl ethers, olefins alkyl-styrenes, halostyrenes, isoalkenyl styrenes, vinylcarbazole, vinyldioxolanes, dialkoxyethylenes, butadiene and isoprene.

Presence of a cationic polymerization catalyst is required for the purpose of this polymerization or copolymerization.

As the cationic polymerization catalyst, there may be used one or more well-known compounds such as boron trifluoride, etherification product thereof, stamic chloride, aluminium chloride, titanium chloride, zinc chloride and sulfuric acid.

The amount of cationic polymerization catalyst thus used is from 0.01% to 10%, preferably from 0.1% to 5%, by weight based on the monomer. When the amount exceeds the upper limit of the said range, the molecular weight of the resultant polymer fails to reach the desired level, although the polymerization velocity may be increased. The reaction does not proceed satisfactorily when the amount is smaller than the lower limit.

The polymerization may be carried out without a solvent in the case of a monomer having a low melting point. Generally, it is preferably carried out in a solution. As the solvent, there may be used one or more well-known solvents which are inactive to the said cationic polymerization catalyst. Examples are methylene chloride, ethylene chloride, nitromethane, carbon tetrachloride and nitrobenzene. The concentration of the monomer is from 0.5 to 90%, preferably from 3 to 70%, by weight. The polymerization temperature is from $-130°$ to 70°C, preferably from $-30°$ to 40°C. The polymerization is carried out by following an ordinary procedure, with due precautions exercised to prevent water from entering the polymerization system. On completion of the polymerization, a small amount of ammonia, pyridine or some other weakly basic substance is introduced into the solution to inactivate the catalyst. The solution is stored either in its unaltered form or in a concentrated form. If the polymer is needed immediately, the solution is poured into an alcohol or some other suitable non-solvent containing a small proportion of the aforesaid weakly basic substance so as to liberate and refine the polymer.

In copolymerizing cinnamic acid-vinylphenyl ester, cinnamic acid-isoalkenylphenyl ester and homologs thereof with various chain polymerizable monomers, the polymerization conditions vary to some extent with the polymerizability of the chain polymerizable compounds being used, though the variation is practically negligible as a whole. The copolymerization, therefore, may be conducted by following the ordinary procedure of homopolymerization with necessary modifications.

The homopolymer and copolymer thus formed are novel compositions in which only the vinyl group or isoalkenyl group is polymerized and the unsaturated group of the generic formula (1) is retained in the side chain of the molecular unit. These products enjoy outstanding properties originating in the photosensitivity inherent to their peculiar configuration and, therefore, can be used as photosensitive resin, varnish, paint and so on.

The method employed for identifying the aforesaid structure of these novel compositions is described.

First, the description is made with respect to cinnamic acid-vinylphenyl ester and homologs thereof.

The infrared spectra of these monomers show an absorption band by $CH_2=CH$ group (styrenic) each near 900 $cm^{-1}$ and 990 $cm^{-1}$ and another absorption band by $-CH=CH-$ group (trans) near 975 $cm^{-1}$. In the infrared spectra of their corresponding cationic polymerization products, the absorption bands near 900 and 990 $cm^{-1}$ have completely disappeared but the absorption band near 975 $cm^{-1}$ has remained. This remaining absorption band is found to have the same intensity as the absorption band observed in the case of the monomers. The infrared spectra of cinnamic acid-isopropenylphenyl ester and homologs thereof as monomers show an absorption band by $CH_2=C(CH_3)$ group near 890 $cm^{-1}$ and another absorption band by $-CH=CH-$ (trans) near 975 $cm^{-1}$ respectively. In the infrared spectra of their correspnding cationic polymerization products, the absorption band near 890 $cm^{-1}$ has completely disappeared but the absorption band near 975 cm$^{-1}$ has remained. The remaining absorption band is found to have the same intensity as the absorption band observed in the case of the monomers. It is thus evident from the review of the infrared spectra that the double bond —CH=CH— is retained even after polymerization.

As will become apparent from the working examples to be cited hereinafter, these polymers are obtained in high yields and are soluble.

The explanation now covers the compound of formula (2) where $n = 1$, namely, the compound of styrylacrylic acid type. This compound is synthesized in accordance with the following chemical equation:

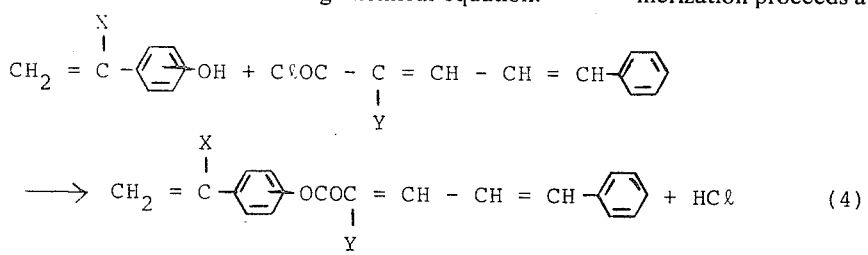

(wherein, X is hydrogen or a lower alkyl, Y is hydrogen or a cyano group, the hydroxyl may occupy any of the ortho-, meta- and para-positions with reference to the vinyl or isoalkenyl group, and the case in which the benzene group of styrylacrylic acid-chloride contains a phenylic hydroxy group or a substituent inactive to the carboxylic acid-chloride, such as hydrogen, nitro group, chlorine, fluorine, methoxy, cyano group or methyl group is also embraced). This reaction occurs between the phenolic hydroxy group and the carboxylic acid-chloride and it generally proceeds readily in the presence of pyridine, triethylamine or some other basic substance serving as a dehydrochlorinating agent. The reaction may be conducted without a solvent or within such solvent as dioxane or acetone. The rate at which this reaction proceeds may be regulated suitably by cooling or heating the reaction system.

By the aforementioned method are obtained styrylacrylic acid-vinylphenyl ester, styrylacrylic acid-isoalkenylphenyl ester and homologs thereof. Examples are styrylacrylic acid-o-, m- and p-vinylphenyl esters, styrylacrylic acid-o-, m- and p-isopropenyl-phenyl esters, styrylacrylic acid-o, m- and p-isobutenylphenyl esters, styryl-(α-cyano)-acrylic acid-o-, m- and p-vinylphenyl esters, styryl-(α-cyano)-acrylic acid-o-, m- and p-isopropenylphenyl esters and styryl-(α-cyano)-acrylic acid-o-, m- and p-isobutenylphenyl esters.

An explanation is now given of the method for producing the novel photosensitive polymer of this invention by using the aforementioned novel compound as the raw material.

The high molecular polymer of the present invention is produced by homopolymerizing one kind or two or more kinds of the said novel compound or copolymerizing the novel compound with a chain polymerizable unsaturated monomer of the type to be described hereinafter.

Examples of the chain polymerizable unsaturated monomers are such cationically polymerizable compounds as alkylvinyl ethers, alkylisoalkenylvinyl ethers, olefins, alkyl styrenes, halostyrenes, isoalkenyl styrenes, vinyl cabazole, vinyl dioxolanes, dialkoxyethylenes, butadiene and isoprene.

For the polymerization or copolymerization, the presence of a cationic polymerization catalyst is indispensable.

As the cationic polymerization catalyst, there is used one member selected from the group consisting of boron trifluoride, etherified boron trifluoride, stannic chloride, aluminum chloride, titanium chloride, zinc chloride and sulfuric acid. There may also be used a cocatalyst formed of two or more members selected from the same group. Generally, the amount of the catalyst to be used is between 0.01% and 10% by weight based on the monomer.

When the amount exceeds the upper limit of this range, the molecular weight of the polymer or copolymer does not reach the desired level, though the polymerization proceeds at a higher rate. The reaction does not proceed completely when the amount is below the lower limit.

The polymerization reaction may be carried out without a solvent in the case of a monomer having a low melting point. Generally, it is carried out within a solvent. The solvent is required to be inactive to cationic polymerization. As such solvent, there is used one member selected from the group consisting of methylene chloride, ethylene chloride, nitromethane, carbon tetrachloride, and nitrobenzene. There may otherwise be used a mixed solvent formed of two or more members selected from the same group.

For the polymerization or copolymerization, the concentration of the monomer is generally fixed in the range of from 0.5% to 90%, preferably from 3 to 70%, by weight. The polymerization temperature is fixed in the range of from −130°C to 70°C, preferably from −30°C to 40°C.

Although the polymerization is conducted by the ordinary procedure, it is especially important that due precautions should be exercised to prevent water from entering the reaction system. After completion of the polymerization, a small amount of ammonia, pyridine or some other weakly basic substance is thrown into the solution to inactivate the catalyst. The solution then is stored in its unaltered form or in a concentrated form. If the polymer is needed immediately, this solution is poured into an alcohol or some other non-solvent containing therein a small proportion of the aforesaid weakly basic substance so as to separate and refine the polymer.

In copolymerizing styrylacrylic acid-vinylphenyl ester, styrylacrylic acid-isoalkenylphenyl ester and homologs thereof with various polymerizable monomers, the polymerization conditions vary to some extent with the polymerizability of the chain polymeric monomers being used, although this variation is practically negligible as a whole. The copolymerization, therefore, may be carried out by following the ordinary procedure of homopolymerization with necessary modifications.

The homopolymer of copolymer thus formed retains, in its molecule, the structure of styrylacrylic acid and its homolog intact as a side chain. The products of homopolymerization or copolymerization, therefore, can be used as a photosensitive resin, varnish, paint and the like on account of their outstanding properties which are ascribable to the photosensitivity inherent in the structure mentioned above.

Now, a description is made of the method by which the aforementioned structure of the novel composition of this invention has been confirmed.

This structure has been determined by infrared spectrum analysis. The analysis has given the results which have already been dealt with. It has consequently been confirmed that only the vinyl group or the isoalkenyl group present in the molecule participates selectively in the polymerization reaction to afford the novel polymer of a special configuration in which the structure of styrylacrylic acid and its homolog is retained in its unaltered form in the side chain.

Take styrylacrylic acid-vinylphenyl ester and homologous monomers therefore, for instance. The infrared spectra of these monomers show an absorption band by $-CH=CH-CH=CH-$ (trans-trans) group near 1,000 $cm^{-1}$. In the infrared spectra of the corresponding cationic polymerization products, however, the absorption bands near 900 $cm^{-1}$ and 990 $cm^{-1}$ have disappeared but the absorption band near 1,000 $cm^{-1}$ has remained. Further, the intensity of absorption is the same as that observed in the case of monomers.

The infrared spectra of styrylacrylic acid-isopropenylphenyl ester and homologous monomers thereof show an absorption band by $CH_2=C(CH_3)-$ group near 890 $cm^{-1}$ and another absorption band by $-CH=CH-CH=CH-$ (trans-trans) group near 1,000 $cm^{-1}$. In the infrared spectra of the corresponding cationic polymerization products, the absorption band near 890 $cm^{-1}$ has completely disappeared but the absorption band near 1,000 $cm^{-1}$ has remained. The intensity of absorption is the same as that observed in the case of monomers.

Also in the case of the copolymerization of styrylacrylic acid-vinylphenyl ester, styrylacrylic acid-isoalkenylphenyl ester and homologs thereof with the aforesaid cationically polymerizable monomers such as isobutylvinyl ether and α-methyl styrene, it has been confirmed by the infrared spectrum analysis that soluble copolymers retaining the structure of styrylacrylic acid and its homolog quantitatively in the side chain are obtained in the same yields as those in the case of homopolymerization.

The same confirmation has been made with respect to all the other polymers and copolymers by using the aforesaid infrared spectrum analysis.

As will become apparent from the working examples to be cited hereinafter, these polymers and copolymers are obtained in high yields and are soluble.

When the polymers of the present invention are put to uses for which photosensitivity is one requirement, they may contain photosensitizers, fillers, thermal polymerization inhibitors and the like which are popularly used as auxiliary ingredients.

The photosensitizers which enjoy popular use include 5-nitroacetonaphthene, picramide, benzophenone, 4,4'-dimethoxybenzophenone, 4-chlorobenzophenone, 4,4'-dichlorobenzophenone, benzoin, benzoinmethyl ether, anthraquinone, β-methylanthraquinone, β-tertiary butylanthraquinone and acetoquinone. As the filler, there are used such inorganic substances as glass powder and silica and such synthetic resins as polypropylene, polymethacrylate, polyamide, and polyethylene terephthalate. The thermal polymerization inhibitors which are usable for the present invention include hydroquinone, pyrogallol, methylene blue, phenol, and n-butylphenol.

When the polymer composition of this invention is exposed to the sunlight or to the rays from a xenon lamp, mercury lamp, carbon arc or similar light source, the aforementioned homopolymer or copolymer which is the photosensistive ingredient undergoes cross-linking reaction and consequently is insolubilized.

On account of this nature, the composition can be used as a photosensitive resin for the production of photoresist, printing resin plate and photosetting bonding agent. It may also be used as the raw material for the production of film and other molded articles.

When the film formed of the photosensitive composition of this invention is exposed to rays through a negative film held fast against it and subsequently treated with a suitable solvent such as triclene, toluene, chloroform, carbon tetrachloride, or ethylene dichloride, the unexposed portion of the film is washed away and the exposed portion remains. Thus, the film produces a relieved image.

The following Examples are further illustrative of this invention, and it will be understood that the invention is not limited thereto.

EXAMPLE 1

(Manufacture of 4-vinyl phenyl cinnamate)

12.00g of p-vinylphenol and 19.90g of cinnamoyl chloride were added to 100 ml of pyridine. The mixture was heated at 50°C for 5 minutes while under agitation, then stirred at normal room temperature for 2 hours and thereafter allowed to stand overnight at room temperature. The resultant solution, upon addition of a solution having 100 ml of concentrated hydrochloric acid diluted with 400 ml of water, produced a precipitate. The precipitate was separated by filtration and washed with water. The precipitate was further washed with 500 ml of 3% cold sodium carbonate solution, subsequently washed with water, dried under reduced pressure and thereafter refined through recrystallization with n-hexane.

| Yield: 20.72g | Melting point: 101 to 102°C |
|---|---|
| Results of elementary analysis | |
| Calculated ($C_{17}H_{14}O_2$) | C 81.58%, H 5.64% |
| Found | C 81.52%, H 5.62% |

(Manufacture of polymer)

1.00g of 4-vinyl phenyl cinnamate was dissolved in 3.00g of methylene chloride. In a flask fitted with a calcium chloride tube, the solution was agitated at 20°C while 0.03g of boron trifluoride etherate was added thereto and then the agitation was continued at this temperature for 3 hours. After polymerization, the contents were diluted with chloroform, and the diluted solution was poured while under vigorous agitation into a large volume of ethanol containing a small volume of ammonia. Consequently, there was obtained a white polymer.

The yield was 0.97g, with $[\eta] = 0.483$ dl/g (THF, 30°C).

(Confirmation of polymer structure)

The infrared spectrum of 4-vinyl phenyl cinnamate showed absorptions caused by $CH_2=CH-$ group (styrene type) near 905 and 990 cm$^{-1}$ and an absorption caused by —CH=CH— (trans) near 975 cm$^{-1}$. In the infrared spectrum of cationic polymerization products, the absorption near 905 and 990 cm$^{-1}$ was completely out of sight and the absorption near 975 cm$^{-1}$ remains and the absorption strength was of the same level as that observed in the corresponding monomer.

EXAMPLE 2

(Manufacture of 4-vinyl phenyl cinnamate polymer)

4-vinyl phenyl cinnamate was polymerized under the same conditions as in Example 1, except the quantity of the etherified trifluoroboron was 0.01g.

The yield was 0.95g, with [η] = 0.521 dl/g (THF, 30°C).

EXAMPLE 3

(Manufacture of 4-vinyl phenyl cinnamate polymer)

1.00g of 4-vinyl phenyl cinnamate was dissolved in 8.90g of methylene chloride. The solution was polymerized at −10°C for 21 hours. Through the treatment of Example 1, the polymer was isolated.

The yield was 0.84g, with [η] = 0.529 dl/g (THF, 30°C).

(Treatment of photosensitive polymer)

The polymer thus obtained was dissolved in chloroform. When this solution was formed into a film on a glass plate, placed at a distance of 15 cm from a high-pressure mercury lamp (100 W) as a light source and exposed to the light for 8 minutes, it was completely insolubilized. When a solution prepared by mixing the polymer with about 4 wt% of 5-nitroacenaphthene was formed into a film in a dark place and exposed to the same mercury lamp positioned at the same distance for 1.5 minutes, it was insolubilized. The same film was also solubilized when it was allowed to expose to a indoor light for 30 minutes.

EXAMPLE 4

(Manufacture of 2-vinyl phenyl cinnamate)

A mixture having 2.40g of o-vinylphenyl and 4.00g of cinnamoyl chloride added to 20 ml of pyridine was stirred overnight at normal room temperature. Thereafter the solution was treated in the same procedure as in Example 1. The product was recrystallized with n-hexane.

| Yield: 3.00g | Melting point: 55 to 56°C |
|---|---|
| Results of elementary analysis | |
| Calculated ($C_{17}H_{14}O_2$) | C 81.58%, H 5.64% |
| Found | C 81.65%, H 5.50% |

(Manufacture of polymer)

1.00g of 2-vinyl phenyl cinnamate was dissolved in a mixture of 2.00g of methylene chloride with 1.00g of nitromethane. The solution was combined, while under agitation at 18°C, with 0.03g of boron trifluoride etherate and allowed to undergo polymerization for 4 hours. The polymer was isolated by the same method as in Example 1.

The yield was 0.91 g with [η] = 0.152 dl/g (THF, 30°C).

EXAMPLE 5

(Manufacture of 3-vinyl phenyl cinnamate)

A mixture having 2.40g of m-vinylphenol and 4.00g of cinnamoyl chloride added to 20 ml of pyridine was subjected to reaction and treatment in the same procedure as in Example 4. The product was purified through recrystallization with normal hexane.

| Yield: 4.11g | Melting point: 67 to 68°C |
|---|---|
| Results of elementary analysis | |
| Calculated ($C_{17}H_{14}O_2$) | C 81.58%, H 5.64% |
| Found | C 81.59%, H 5.65% |

(Manufacture of polymer)

0.62g of 3-vinyl phenyl cinnamate was dissolved in 1.90g of nitromethane. The solution was combined, while under agitation at 18°C, with 0.01g of boron trifluoride etherate and allowed to undergo polymerization for 4 hours. The polymer was isolated by the same method as used in Example 1.

The yield was 0.52g, with [η] = 0.053 dl/g (THF, 30°C).

(Treatment of photosensitive polymer)

When a film was made from the resultant polymer and then exposed to the light in entirely the same manner as in Example 3, the film was completely insolubilized.

EXAMPLE 6

(Manufacture of 4-isopropenyl phenyl cinnamate)

A mixture having 2.00g of p-isopropenylphenol and 4.00g of cinnamoyl chloride added to 20 ml of pyridine was subjected to reaction in the same procedure as in Example 4. After completion of the reaction, the reaction solution was combined with a solution of 40 ml of acetic acid in 40 ml water. Consequently, the solution produced a precipitate, which was separated by filtration and washed with water. The precipitate was further washed with 100 ml of 3% cold sodium carbonate solution, subsequently washed with water, dried under reduced pressure and thereafter purified through recrystallization with ethanol.

| Yield: 2.92g | Melting point: 108 to 110°C |
|---|---|
| Results of elementary analysis | |
| Calculated ($C_{18}H_{16}O_2$) | C 81.79%, H 6.10% |
| Found | C 81.81%, H 6.07% |

(Manufacture of polymer)

1.00g of 4-isopropenyl phenyl cinnamate was dissolved in 3.00g of methylene chloride. The solution was combined, while under agitation at 20°C, with 0.01g of boron trifluoride etherate and allowed to undergo polymerization for 23 hours. The polymer was isolated by the same method as in Example 1.

The yield was 0.44g, with [η] = 0.038 dl/g (THF, 30°C).

(Treatment of photosensitive polymer)

The resultant polymer was dissolved in chloroform and formed into a film on a glass plate. When the film was exposed to the light in the same manner as in Example 3, the film was insolubilized.

EXAMPLE 7

(Manufacture of 4-isoprokenyl phenyl cinnamate polymer)

1.00g of 4-isopropenyl phenyl cinnamate was dissolved in 19.00g of methylene chloride. The solution was combined, while under agitation at −25°C, with 0.03g of boron trifluoride etherate and allowed to undergo polymerization for 23 hours. The polymer was isolated by the same method as used in Example 1.

The yield was 0.19g, with $[\eta] = 0.068$ dl/g (THF. 30°C).

EXAMPLE 8

(Manufacture of 4-vinyl phenyl 3-nitro cinnamate)

A mixture having 2.50g of p-vinylphenol and 5.70g of m-nitro cinnamoyl chloride added to 25 ml of pyridine was subjected to reaction and treatment in the same procedure as in Example 1. The product was purified through recrystallization with ethanol.

(Manufacture of polymer)

1.00g of 4-vinyl phenyl 3-nitro cinnamate was dissolved in 3.00g of methylene chloride. The solution was combined, while under agitation at 0°C, with 0.03g of boron trifluoride etherate and allowed to undergo polymerization for 2.5 hours. The polymer was isolated by the same method as employed in Example 1.

The yield was 1.00g, with $[\eta] = 0.450$ dl/g (THF. 30°C).

(Treatment of photosensitive polymer)

When a film was made from the resultant polymer by the method of Example 2 and exposed to the mercury lamp, the film was completely insolubilized.

EXAMPLE 9

(Manufacture of 4-vinyl phenyl 3-nitro cinnamate polymer)

1.00g of 4-vinyl phenyl 3-nitro cinnamate was dissolved in 6.00g of nitromethane. When this solution was combined, while under agitation at 15°C, with 0.03g of boron trifluoride etherate, polymerization terminated instantaneously and the polymer thus formed separated itself as a sediment. The polymer was isolated by the same method as used in Example 1.

The yield was 1.00g, with $[\eta] = 0.250$ dl/g (THF. 30°C).

EXAMPLE 10

(Manufacture of 4-vinyl pehnyl α-cyano cinnamate)

Synthesis was effected on 2.00g of p-vinylphenol, 4.40g of α-cyano cinnamoyl chloride and 30 ml of pyridine in the same procedure as in Example 1. The product was recrystallized with ethanol.

Yield: 4.22g
Melting point: 144 to 145°C
Results of elementary analysis
Calculated ($C_{18}H_{13}O_2N$)   C 78.53%, H 4.76%, N 5.09%
Found                              C 78.53%, H 4.57%, N 5.00%

(Manufacture of polymer)

1.00g of 4-vinyl phenyl α-cyano cinnamate was dissolved in a mixture of 5.00g of methylene chloride with 2.00g of nitrobenzene. The solution was combined, while under agitation at 20°C, with 0.02g of boron trifluride etherate and allowed to polymerize for 3 hours. The polymer was isolated by the same method as used in Example 1. Since this operation involved the use of nitrobenzene, the entire operation was carried out in a dark place.

The yield was 0.90g, with $[\eta] = 0.468$ dl/g (THF. 30°C).

(Treatment of photosensitive polymer)

When a film was formed from the polymer and exposed to the light in entirely the same manner as in Example 1, the film was completely insolubilized.

EXAMPLE 11

(Manufacture of 4-vinyl phenyl cinnamate copolymer)

1.00g of 4-vinyl phenyl cinnamate and 0.40g of isobutyl vinyl ether were dissolved in 4.20g of methylene chloride. The solution was combined, while under agitation at 0°C, with 0.03g of boron trifluoride etherate and allowed to undergo polymerization for 3 hours. The copolymer was isolated by the same method as used in Example 1.

The yield was 1.04g, with $[\eta] = 0.188$ dl/g (THF. 30°C).

EXAMPLE 12

(Manufacture of 4-vinyl phenyl 3-nitro cinnamate copolymer)

1.00g of 4-vinyl phenyl 3-nitro cinnamate and 0.33g of isobutyl vinyl ether were dissolved in 4.00g of methylene chloride. The solution was combined, while under agitation at 0°C, with 0.03 g of boron trifluoride etherate and allowed to undergo polymerization for 3 hours. The copolymer was isolated by the same method as used in Example 1.

The yield was 1.07g with $[\eta] = 0.231$ dl/g (THF. 30°C).

EXAMPLE 13

(Manufacture of 4-vinyl phenyl β-styryl acrylate)

A mixture having 1.8g of p-vinylphenol and 4.0g of β-styryl acryloyl chloride added to 40 ml of pyridine was heated to 40°C and agitated for 1.5 hours, subsequently agitated at normal room temperature for 2.5 hours and thereafter allowed to stand overnight. Into the solution at rest, 200 ml of water containing 4 ml of concentrated sulfuric acid was poured to cause precipitation. The resultant precipitate was separated through filtration and washed with water. The precipitate was further washed with 100 ml of 30% solution cold sodium carbonate, subsequently washed with water, dried under reduced pressure and thereafter recrystallized with alcohol for purification.

Yield: 3.5g
Melting point: 149.5 to 150.5°C
Results of elementary analysis
Calculated ($C_{19}H_{18}O_2$)   C 82.68%, H 5.84%
Found                             C 82.72%, H 5.83%

(Manufacture of polymer)

A moistureproof flask fitted with a calcium chloride tube was charged with a solution of 1.10g of 4-vinyl phenyl β-styryl acrylate in 10.00g of methylene chloride. The charge was combined, while under agitation at 25°C, with 0.03g of boron trifluoride etherate. The agitation was continued for 3 hours at the same temperature. After polymerization, the contents were poured into a large volume of ethanol containing a small volume of ammonia while under vigorous agitation. Consequently, there was obtained a white polymer.

The yield was 1.08g, with $[\eta] = 0.444$ dl/g (THF. 30°C).

EXAMPLE 14

(Manufacture of 4-vinyl phenyl β-styryl acrylate polymer)

Polymerization was carried out under the same conditions as those used in Example 13, except 4-vinyl phenyl β-styryl acrylate was used in the amount of 1.00g and boron trifluoride etherate in the amount of 0.01g respectively.

The yield was 0.96g, with $[\eta] = 0.491$ (THF. 30°C).

(Treatment of photosensitive polymer)

The resultant polymer was dissolved in chloroform. When the solution was formed into a film on a glass plate, placed at a distance of 15 cm from a xenon lamp (500 W) as light source and exposed to the light for 5 minutes, the film was completely insolubilized.

EXAMPLE 15

(Manufacture of 4-vinyl phenyl β-styryl acrylate copolymer)

A solution of 0.8g of 4-vinyl phenyl β-styryl acrylate and 0.02g of isobutyl vinyl ether in 2.0g of methylene chloride was combined, while under agitation at −5°C, with 0.003g of boron trifluoride etherate and then allowed to polymerize for 5 hours. By the procedure of Example 13, the copolymer was isolated.

The yield was 0.49g, with $[\eta] = 0.219$ dl/g (THF. 30°C).

EXAMPLE 16

(Manufacture of 2-vinyl phenyl β-styryl acrylate)

A mixture having 1.8g of o-vinylphenol and 4.0g of β-styryl acryloyl chloride added to 40 ml of pyridine was heated to 40°– 45°C and agitated for 2 hours and subsequently allowed to stand overnight at room temperature.

By treating the solution at rest with dilute solution of hydrochloric acid in the same manner as in Example 13, there was obtained an oily precipitate. This oily substance, together with the supernatant, was extracted twice with 50 ml of benzene. The extracted solution was washed twice with 5 ml of 3.0% solution of cold sodium carbonate and further washed with water. The benzene solution was dried with anhydrous sodium sulfate and thereafter concentrated to afford a product in a crystalline form. This product was purified through recrystallization with n-hexane.

| | |
|---|---|
| Yield: 3.0g | Melting point: 73.1 to 74.5°C |
| Results of elementary analysis | |
| Calculated ($C_{19}H_{18}O_2$) | C 82.68%, H 5.84% |
| Found | C 82.86%, H 5.90% |

(Manufacture of polymer)

A solution of 1.00g of 2-vinyl phenyl β-styryl acrylate in 10.00g of methylene chloride was combined, while under agitation at 10°C, with 0.03g of boron trifluoride etherate and then allowed to undergo polymerization for 15 hours. By following the procedure of Example 13, the polymer was isolated.

The yield was 0.39g, with $[\eta] = 0.07$ dl/g (THF. 30°C).

EXAMPLE 17

(Manufacture of 3-vinyl phenyl β-styryl acrylate)

A mixture having 1.8g of m-vinylphenol and 4.0g of β-styryl acryloyl chloride added to 40 ml of pyridine was heated to 40°C and agitated for 3 hours and then allowed to stand overnight at normal room temperature. Thereafter, the procedure of the Example 13 was followed. The product was recrystallized with n-hexane.

| | |
|---|---|
| Yield: 3.1g | Melting point: 66.5 to 67.8°C |
| Results of elementary analysis | |
| Calculated ($C_{19}H_{18}O_2$) | C 82.68%, H 5.84% |
| Found | C 82.58%, H 5.83% |

(Manufacture of polymer)

1.14g of 3-vinyl phenyl β-styryl acrylate was dissolved in 10.00g of methylene chloride. The solution was combined, while under agitation at 5°C, with 0.03g or boron trifluoride etherate. The agitation was continued for 3.5 hours at the same temperature. By following the procedure of Example 13 subsequently, the polymer was isolated.

The yield was 1.02g, with $[\eta] = 0.129$ dl/g (THF. 30°C).

EXAMPLE 18

(Manufacture of 4-isopropenyl phenyl β-styryl acrylate)

A mixture having 2.0g of p-isopropenylphenol and 4.2g of β-styryl acryloyl chloride added to and dissolved in 40 ml of pyridine was heated to 50°C and agitated for 2.5 hours, thereafter agitated at normal room temperature for 4 hours and allowed to stand overnight.

By adding 200 ml of water containing 30 ml of glacial acetic acid to and the solution at rest, there was produced a precipitate. The product was obtained by following the procedure of Example 13 from this point forward. It was purified through recrystallization with toluene.

Yield: 3.4g
Melting point: 163.5 to 165.2°C
Results of elementary analysis
Calculated ($C_{20}H_{20}O_2$)  C 82.73%, H 6.25%
Found  C 82.93%, H 6.26%

(Manufacture of polymer)

A solution of 1.36g of 4-isoprophenyl β-styryl acrylate in 20g of methylene chloride was combined, while under agitation at 10°C, with 0.03g of boron trifluoride etherate and allowed to undergo polymerization for 40 hours. By conducting the treatment in the same manner as in Example 13, the polymer was obtained.

The yield was 0.77g, with $[\eta]$ = 0.114 dl/g (THF. 30°C).

EXAMPLE 19

(Manufacture of 4-vinyl phenyl α-cyano-β-styryl acrylate)

A mixture having 1.8g of p-vinylphenol and 4.4g of α-cyano-β-styryl acryloyl chloride added to 40 ml of pyridine was subjected to reaction by following the procedure of Example 13. The reaction product was purified through recrystallization with benzene.

Yield: 3.7g
Melting point: 172 to 173.5°C
Results of elementary analysis
Calculated ($C_{20}H_{15}NO_2$)  C 79.72%, H 5.02%, N 4.65%
Found  C 80.73%, H 5.07%, N 4.54%

(Manufacture of polymer)

A solution of 1.00g of 4-vinyl phenyl α-cyano-β-styryl acrylate in 10.00g of methylene chloride was combined, while under agitation, with 0.03g of boron trifluoride etherate. By following the procedure of Example 13, the polymer was isolated.

The yield was 0.84g, with $[\eta]$ = 0.300 dl/g (THF. 30°C).

The polymer thus obtained was dissolved in chloroform. When this solution was spread and formed into a film of uniform. Thickness on a glass plate and then exposed to the light by the same method as used in Example 14, the film was insolubilized.

EXAMPLE 20

(Manufacture of 2-vinyl phenyl α-cyano-β-styryl acrylate)

A mixture having 1.8g of o-vinylphenol and 4.4g of α-cyano-β-styryl acryloyl chloride added to 40 ml of pyridine was heated to 40°C and agitated for 3 hours and thereafter allowed to stand overnight. The reaction mixture was treated in the same procedure as in Example 13 afford the product. This was purified through recrystallization with alcohol.

Yield: 3.4g
Melting point: 145 to 146.8°C
Results of elementary analysis
Calculated ($C_{20}H_{15}NO_2$)  C 79.72%, H 5.02%, N 4.65%
Found  C 80.21%, H 4.86%, N 4.56%

(Manufacture of Polymer)

0.99 g of 2-vinyl phenyl α-cyano-β-styryl acrylate was dissolved in a mixture of 10.00g of methylene chloride with 10.00g of nitromethane. The solution was combined, while under agitation at 10°C, with 0.03g of boron trifluoride etherate and allowed to undergo polymerization for 15 hours. By conducting the same after-treatment was in Example 13, the polymer was isolated.

The yield was 0.86g, with $[\eta]$ = 0.138 dl/g (THF. 30°C).

What is claimed is:

1. A photosensitive homopolymer having a chain formed by polymerizing the $CH_2=CX$ group of a monomer of the formula

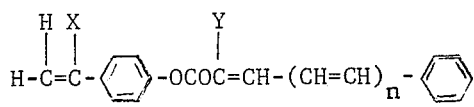

wherein X is H or a lower alkyl, Y is one member selected from the group consisting of H and CN group, n is 0 or 1, and the phenyl in the styrylacrylic acid group or cinnamic acid group is one member selected from the group consisting of unsubstituted groups, substituents of chlorine, fluorine, nitro group, cyano group, methoxy group, and methyl group which are inactive to phenolic hydroxy group and carboxylic acid-chlorides, said homopolymer having repetitive units each having the formula

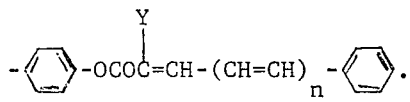

2. A photosensitive copolymer having a chain formed by polymerizing the $CH_2=CX$ group of at least two different monomers of the formula

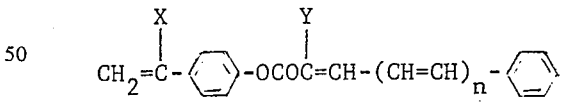

wherein X is H or a lower alkyl, Y is one member selected from the group consisting of H and CN group, n is 0 or 1, and the phenyl in the styrylacrylic acid group or cinnamic acid group is one member selected from the group consisting of unsubstituted groups, substituents of chlorine, fluorine, nitro group, cyano group, methoxy group, and methyl group which are inactive to phenolic hydroxy group and carboxylic acid-chlorides, and wherein said copolymer is polymerized from at least two different monomers represented by the above-mentioned formula which differ in at least one of X, Y, n and the phenyl in the styrylacrylic acid group or cinnamic acid group, said copolymer having repetitive units each having the formula

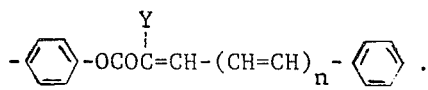

3. A photosensitive copolymer having a chain formed by polymerizing the $CH_2=CX$ group of at least one photosensitive monomer (1) of the formula

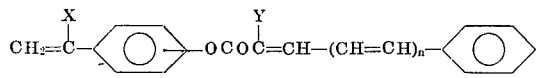

wherein, X is H or a lower alkyl, Y is one member selected from the group consisting of H and CN group, $n$ is 0 or 1, and the phenyl is the styrylacrylic acid group or cinnamic acid group is one member selected from the group consisting of unsubstituted phenyl groups, a phenyl group substituted with chlorine, fluorine, nitro group, cyano group, methoxy group, and methyl group which are inactive to phenolic hydroxy group and carboxylic acid-chlorides, and the unsaturated group of a chain cationically copolymerizable unsaturated monomer (2), to form a copolymer chain containing pendant repetitive photosensitive units (3) of the formula

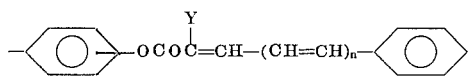

the amount of said repetitive photosensitive units (3) being sufficient to impart photosensitive characteristics to said copolymer.

4. The photosensitive copolymer of chain 3 wherein at least one of the monomers of (2) is selected from the group consisting of alkylvinyl ethers, alkylisoalkenylvinyl ethers, olefins, alkylstyrenes, halostyrenes, vinyl carbazole, vinyldioxolanes, dialkoxyethylene, butadiene and isoprene.

* * * * *

UNITED STATES PATENT AND TRADEMARK OFFICE
CERTIFICATE OF CORRECTION

PATENT NO. : 3,882,084
DATED : 6 May 1975
INVENTOR(S) : Masao KATO, Masaki HASEGAWA, Taro ICHIJYO It is certified that error appears in the above-identified patent and that said Letters Patent are hereby corrected as shown below:

In the heading, line [75], for the first inventor's surname "Tato" read -- Kato -- .

Signed and Sealed this twentieth Day of April 1976

[SEAL]

Attest:

RUTH C. MASON
*Attesting Officer*

C. MARSHALL DANN
*Commissioner of Patents and Trademarks*